(12) United States Patent
Allmendinger

(10) Patent No.: US 12,167,724 B2
(45) Date of Patent: Dec. 17, 2024

(54) GEOFENCED AUTONOMOUS AQUATIC DRONE

(71) Applicant: Craig D. Allmendinger, Waterbury, CT (US)

(72) Inventor: Craig D. Allmendinger, Waterbury, CT (US)

(*) Notice: Subject to any disclaimer, the term of this patent is extended or adjusted under 35 U.S.C. 154(b) by 306 days.

(21) Appl. No.: 17/738,663

(22) Filed: May 6, 2022

(65) Prior Publication Data

US 2022/0354099 A1 Nov. 10, 2022

Related U.S. Application Data

(60) Provisional application No. 63/184,868, filed on May 6, 2021.

(51) Int. Cl.
| | | |
|---|---|---|
| *A01K 79/02* | (2006.01) | |
| *B63C 9/00* | (2006.01) | |
| *B63G 8/00* | (2006.01) | |
| *B63G 8/08* | (2006.01) | |
| *H04W 4/021* | (2018.01) | |

(52) U.S. Cl.
CPC ............... *A01K 79/02* (2013.01); *B63C 9/00* (2013.01); *B63G 8/001* (2013.01); *B63G 8/08* (2013.01); *H04W 4/021* (2013.01); *B63C 2009/0017* (2013.01); *B63C 2009/0088* (2013.01); *B63G 2008/004* (2013.01); *B63G 2008/008* (2013.01)

(58) Field of Classification Search
CPC .. A01K 79/02; B63C 9/00; B63C 2009/0017; B63C 2009/0088; B63G 8/001; B63G 8/08; B63G 2008/004; B63G 2008/008; H04W 4/021
See application file for complete search history.

(56) References Cited

U.S. PATENT DOCUMENTS

| | | | |
|---|---|---|---|
| 3,164,772 | A | 1/1965 | Hicks, IV |
| 3,317,889 | A | 5/1967 | Barrand |
| 5,570,322 | A | 10/1996 | Miller |
| 5,883,858 | A | 3/1999 | Holt |
| 6,999,379 | B2 | 2/2006 | Nadeau |
| 7,037,153 | B1 | 5/2006 | Wynne |

(Continued)

FOREIGN PATENT DOCUMENTS

| | | |
|---|---|---|
| FR | 2996341 | 4/2014 |
| FR | 3056191 | 3/2018 |

(Continued)

*Primary Examiner* — Isam A Alsomiri
*Assistant Examiner* — Abdallah Abulaban
(74) *Attorney, Agent, or Firm* — McHale & Slavin, P.A.

(57) ABSTRACT

A geofenced autonomous aquatic drone for repelling sharks from a shoreline. The drone employs a buoyant housing resembling a portion of a predator such as an orca whale. A battery positioned within the drone is recharged through a floating inductive charging station. A transmitter unit coupled to at least one under water transducer introduces certain sounds, such as reproduction of orca whale or dolphin calling sounds. A propulsion system controlled a microprocessor receives location information via DGPS for providing a geofence around an area to be patrolled. The drone travels within the geofence area, monitored by the DGPS receiver, while said transducer produces certain sounds and or a solution of shark repellant is dispensed.

13 Claims, 3 Drawing Sheets

(56) References Cited

U.S. PATENT DOCUMENTS

| | | | |
|---|---|---|---|
| 7,302,905 | B1 | 12/2007 | Wynne |
| 7,731,554 | B2 | 6/2010 | Grune |
| 8,383,138 | B2 | 2/2013 | Drew |
| 9,648,865 | B2 | 5/2017 | Lyon |
| 10,054,104 | B1 | 8/2018 | Cote |
| 10,875,613 | B2 | 12/2020 | Vining et al. |
| 2002/0196708 | A1* | 12/2002 | Smith ................ A01M 29/16 340/573.2 |
| 2012/0031343 | A1 | 2/2012 | DeLuze |
| 2015/0183498 | A1 | 7/2015 | Wardle |
| 2019/0059391 | A1* | 2/2019 | Kurup ................ A01N 59/12 |
| 2019/0135394 | A1* | 5/2019 | Vining ................ B63G 13/00 |
| 2021/0394633 | A1* | 12/2021 | Curran ................ B60L 53/12 |

FOREIGN PATENT DOCUMENTS

| | | |
|---|---|---|
| GB | 2584284 | 3/2017 |
| GB | 2543870 | 2/2020 |

\* cited by examiner

GEOFENCED AUTONOMOUS AQUATIC DRONE

PRIORITY CLAIM

In accordance with 37 C.F.R. § 1.76, a claim of priority is included in an Application Data Sheet filed concurrently herewith. Accordingly, the present application claims the priority date of U.S. Provisional Patent Application No. 63/184,868 filed May 6, 2021 entitled "GEOFENCED AUTONOMOUS AQUATIC DRONE" the contents of which are incorporated herein by reference.

FIELD OF THE INVENTION

The field of the invention is shark repellant devices; and more particularly, an autonomous aquatic drone using a DGPS geofence to patrol a shoreline and deploy electrical or chemical shark repellant and deterrents.

BACKGROUND OF THE INVENTION

Shark attacks are a terrifying ordeal to hear about, much less experience. News reports sensationalize shark attacks and conjure up memories of a blockbuster movie that put a fear of predatory sharks into most every human. In light of the above, the average person is hesitant to enter the water when sharks congregate near the shoreline.

Despite the rarity of shark attacks, almost any large shark roughly six feet or longer, is a potential threat to humans. Three species, however, have been repetitively implicated as the primary attackers: the white shark (*Carcharodon carcharias*), tiger shark (*Galeocerdo cuvier*) and bull shark (*Carcharhinus leucas*). Other species, including the great hammerhead (*Sphyrna mokarran*), shortfin mako (*Isurus oxyrhynchus*), oceanic whitetip (*Carcharhinus longimanus*), Galapagos (*Carcharhinus galapagensis*), and certain reef sharks (such as the Caribbean reef shark (*Carcharhinus perezi*)), have also been implicated in attacks, but to a lesser degree.

Typically, a shark performs "hit and run" attacks, which are probably cases of mistaken identity due to poor visibility. It is suspected that attacks occur when a shark misinterprets a human for its prey. Upon biting of a human, the shark realizes that the human is not the desired prey and moves on. However, deadly shark attacks have also been known to happen.

The use of shark repellents dates back to the 1940's, when the U.S. Navy employed shark repellents during WWII. Shark repellent technologies include magnetic shark repellents, electrical repellents, acoustic repellents, and chemical repellents, such as pheromones produced by orca whales. Shark repellents can be used to protect people from sharks by driving the sharks away from areas where they are likely to interface with human beings.

The sensationalism of a shark attack anywhere in the world can affect an individual's decision to enter the surf along an ocean shoreline. This directly affects the financial well being of ocean side villages and resorts who rely upon tourism that are drawn to the seaside. The splashing and movement of individuals in the water tends to attract some marine predators, wherein individuals who do not want to tempt fate take their tourism dollars elsewhere.

What is needed in the industry is an autonomous device that uses various shark repellant technologies to deter sharks within a certain area, such as near a shoreline, increasing the safety level to those entering the water.

PRIOR ART

U.S. Pat. No. 10,875,613 discloses a motorized, floating device that is tethered with another aquatic device that carries a passenger or passengers, such as a surfboard or personal watercraft. The disclosure includes components such as magnetic field emitters that deter aquatic animals from approaching the aquatic device without interfering with the operation of the aquatic device.

FR 2,996,341 discloses an autonomous and rechargeable sound diffuser housing for use with aquatic sports equipment such as surfboards. A rechargeable battery supplies electric energy to an emitter device. The emitter reproduces the sounds, such as alarm cries emitted by dolphins, and emits the sounds under conditions of power and frequency to move sharks away from the emitter a secure distance.

U.S. Publication No. 2015/0183498 discloses an autonomous submersible aquatic drone, a system utilizing an autonomous submersible aquatic drone and a control unit, a control unit for controlling an autonomous submersible aquatic drone, and a method for using the same. The submersible drone is tethered and surveys a predetermined area around a person engaged in a water sport for the presence of an underwater threat. When the aquatic drone detects the presence of an underwater threat, the submersible drone sends a warning signal to a control unit worn by the person.

U.S. Pat. No. 7,731,554 discloses a shark-repelling surfboard or flotation board made of polymer foam with coating. The surfboard or the flotation board has a locator device for locating large aquatic animals, and an alarm device for alerting a rider of large aquatic animals, such as sharks, located by the locator device. The surfboard or the flotation board also comprises a repellent or deterrent signal generator that is configured for transmitting interference signals to disrupt the electro-sensory perception system of the aquatic animals.

U.S. Pat. Nos. 7,302,905 and 7,037,153 disclose a shark repellent system having an attachable magnet and a transmitter unit that emits sound waves at a frequency undesirable to sharks, for use while boating or surfing. The transmitter unit is contained in a watertight enclosure affixed to a buoyant device. The transmitter unit may also be positioned within a boat or other buoyant device, wherein the transmitter unit includes a plurality of transducers electrically connected to the transmitter unit via elongated cables, and the cables and transmitter units are extended over the sides of the boat, or by a tether and band if being used with a surfboard.

U.S. Pat. No. 9,648,865 discloses a chondrichthyan repelling system comprising at least one fin comprising at least one electrically conductive electrode for connection to an electrical signal generator. In use, the electrical signal generator generates electrical signals to the at least one electrode to thereby radiate an electrical field which repels chondrichthyans. Also disclosed are various fin designs incorporating one or more electrodes, and a watercraft having one or more fins as described.

U.S. Pat. No. 3,164,772 discloses a portable apparatus for repelling sharks comprising an antenna adapted to be immersed in sea water in contact therewith, means for securing said antenna in exposed position to a body to be floated in sea water, and a small self-contained unit, means for securing said unit to a body to be floated in sea water with said antenna immersed, said unit including a capacitor, a battery, means for charging said capacitor from said battery, and means for periodically discharging said capacitor to said antenna.

U.S. Pat. No. 5,883,858 discloses a device that provides signals generated electronically at a variety of frequencies broadcast under water in the presence of various species of aquatic animals. The behavior alteration can include any number of responses, including attraction, feeding, aggression, repelling, fleeing, reproductive behavior, aggregation, shoaling, migration, movements up or down, etc.

FR 3,056,191 discloses an autonomous protection system to assist a victim of a shark attack. The invention relates to a system for attacking a shark by emitting vibrating, acoustic and electrical pulses, all of which can be parameterized, and in particular directly to its jaw during the first bite. It attempts to repel the shark, keep it away, and avoid recurrence. The device contains an electrical mesh and is equipped with a microprocessor to self-diagnose, detect an attack, and trigger an active process of aggression towards the shark.

GB 2,543,870 discloses a pulse generator for deterring marine animals by controlling the duration and amplitude of the pulse such that the pulse does not damage the marine animals and other non-target species.

U.S. Pat. No. 6,999,379 discloses a marine and land transmission detraction and deterrence device designed to protect swimmers, scuba divers, surfers, hikers, hunters, campers and other individuals engaged in water and/or land activities from attacks by sharks as well as from attacks from other marine and land predators. The device can selectively be worn either on a person's wrist or attached to any part of the human body or marine or land equipment, such as surfboards, flotation devices, and camping gear, and emits a high frequency pitch in varying sequential intervals that is easily heard and recognized by sharks and/or by other targeted land and marine human predators. The personal protective device includes a sound generator for reproducing a sound known to repel predators, a piezoelectric speaker, and a power supply for supplying electrical energy to the sound generator and speaker contained in a waterproof package. The recorded sounds consist of bottle-nosed dolphins, sperm whales, killer whales feeding, humpback whales, or the like.

U.S. Publication No. 2012/0031343 discloses a sealed unit small enough to be worn by a swimmer. It contains a rechargeable battery, control interface logic, digital signal generation, and amplification circuitry. It uses a ground balanced electrode system to produce electric fields in the very low impedance environment of water. These fields are organized into patterns called words. These words are presented in a hierarchal pseudo random manner to prevent target organisms from learning and adapting to them. The presentation of these words is controlled by upgradable programming stored within memory. The words evoke central nervous system (CNS) responses which result in sharks leaving the area of operation. These words represent stimuli of predators, navigation signals, noxious events, CNS interference patterns, and other sequences found to repel sharks from the protected area.

U.S. Publication No. 2019/0059391 discloses a water soluble organic mixture introduced in water as a deterrent to sharks. The organic deterrent comprises a mixture of iodinated water with garcinia gumma gutta and spices.

U.S. Pat. No. 3,317,889 discloses an apparatus for repelling sharks by vibrating a line at a specified frequency that generates a sound to repel sharks.

U.S. Pat. No. 5,570,322 discloses a barracuda-repelling sound generation device that generates and transmits sounds and light that is purportedly irritating to barracudas.

SUMMARY OF THE INVENTION

Disclosed is an autonomous aquatic drone formed from a buoyant housing that resembles a portion of a shark predator, such as an orca whale fin. The drone is partially submerged for placement of a transducer or chemical repellant. A portion of the drone remains above the water for clear reception of gps data and instructional uploads. The drone has a rechargeable battery positioned within the buoyant housing which can be recharged through a floating inductive charging station. A microprocessor within the buoyant housing and electrically coupled to the battery provides control of a propulsion system and a transmitter. The propulsion system is constructed and arranged to navigate the drone according to the instructions provided to the microprocessor. The propulsion system directly the drone to travel within a geofence area calculated from a Differential Global Positioning System (DGPS) receiver. The transmitter is coupled to the transducer for produces certain sounds, such as reproduction of orca whale sounds or dolphin sounds. Alternatively, or in addition thereto, the transducer may produce sound waves, electrical frequency, or a magnetic field into water. For instance, a frequency generator may be used in a range of frequencies between 200 Hz and 1,500 Hz which is known to be a shark repellant. Sound waves emitted from the transducer may be in a pulsing manner at a frequency undesirable to sharks. In addition, or as an alternative, a solution of shark repellant such as pheromones produced by orca whales may be attached to the drone for dispensing the solution as the device patrols the geofenced area. The drone returns to a floating charging station when the battery reaches a predetermined battery threshold. The floating charging station is preferable attached to a dock or pier wherein alternating current is available to allow for a quick recharge of the battery.

The appearance of the drone replicates a portion of the shark predator. Preferably the drone has the appearance of orca, sperm whale, dolphin or any other shark predator dorsal fin. The shape of the dorsal fin being of concern to a shark, indicia on the side of the dorsal fin may be added so as not to alarm individuals who see the drone traversing the water. The shape of the drone may not include a dorsal fin, wherein the drone can be tethered to a float on the surface of the water, for uninterrupted satellite interface for DGPS tracking.

In one mode, the drone randomly patrols the area within a geofenced area. This mode is preferred when no one is using the geofenced area, such as night time. In another mode, the drone follows the outer perimeter of the geofenced area. This mode is preferred when the geofenced area is in use by bathers.

An objective of the invention is to provide an autonomous aquatic drone that continuously patrols a predefined area dispensing a solution of shark repellant, or employs a transducer to transmit sounds, sound waves, electrical frequency, or a magnetic field into water, or a combination thereof.

Another objective of the invention is to provide a geofenced autonomous aquatic drone using a DGPS receiver, allowing the drone to randomly patrol an area within a geofenced area, or track a predetermined path within said geofenced area.

Still another objective of the invention is to disclose the use of a floating inductive charging station when the battery in the drone reaches a predetermined battery threshold.

Yet still another objective of the invention is to disclose the use of a geofenced autonomous drone for patrolling shorelines to repel or deter sharks with a device that is small in size and has low power consumption providing a longer battery life.

Another objective of the invention is to disclose the use of a self propelled device that has the appearance of an orca, sperm whale, dolphin, or other shark predator.

Still another objective of the invention is to disclose programming wherein, in one mode, the device will continuously sweep an uninhabitable area of shoreline within a geofenced section in a random fashion and return to a docking station when a battery recharge and/or shark repellent solution refill is required.

Yet still another objective of the invention is to disclose programming wherein, in a second mode, the device will continuously monitor a geofenced section when the area is inhabited, wherein the device operates in a programmed track, such as the outer perimeter.

Another objective of the invention is to disclose the use of a rechargeable battery positioned within a chamber using inductive charging via an electromagnetic field to transfer energy from a floating power source to the rechargeable battery; the inductive charging is performed by the floating charging station that may be attached to a dock, pier or like structure for automatic docking of the device when a recharge is required.

Other objectives and advantages of this invention will become apparent from the following description taken in conjunction with any accompanying drawings wherein are set forth, by way of illustration and example, certain embodiments of this invention. Any drawings contained herein constitute a part of this specification, include exemplary embodiments of the present invention, and illustrate various objects and features thereof.

DETAILED DESCRIPTION OF THE PREFERRED EMBODIMENT

Figure 1:
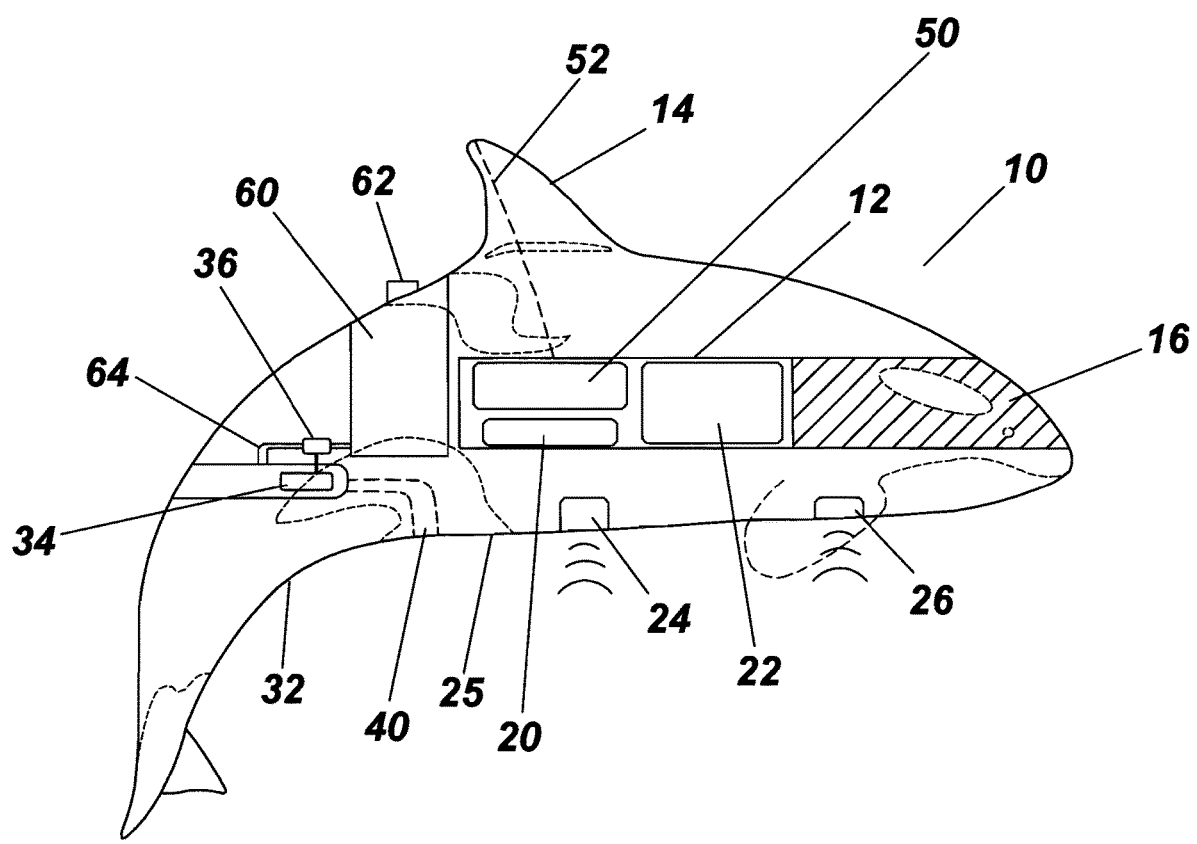
FIG. 1 is a cross-sectional side view of the geofenced autonomous aquatic drone of the instant invention.
Figure 2:
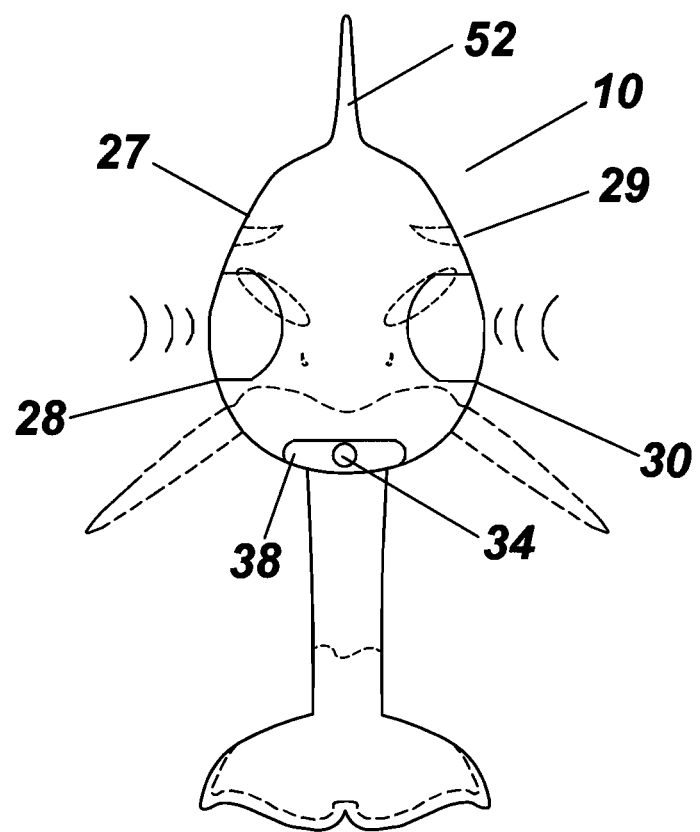
FIG. 2 is a rear end view thereof.
Figure 3:
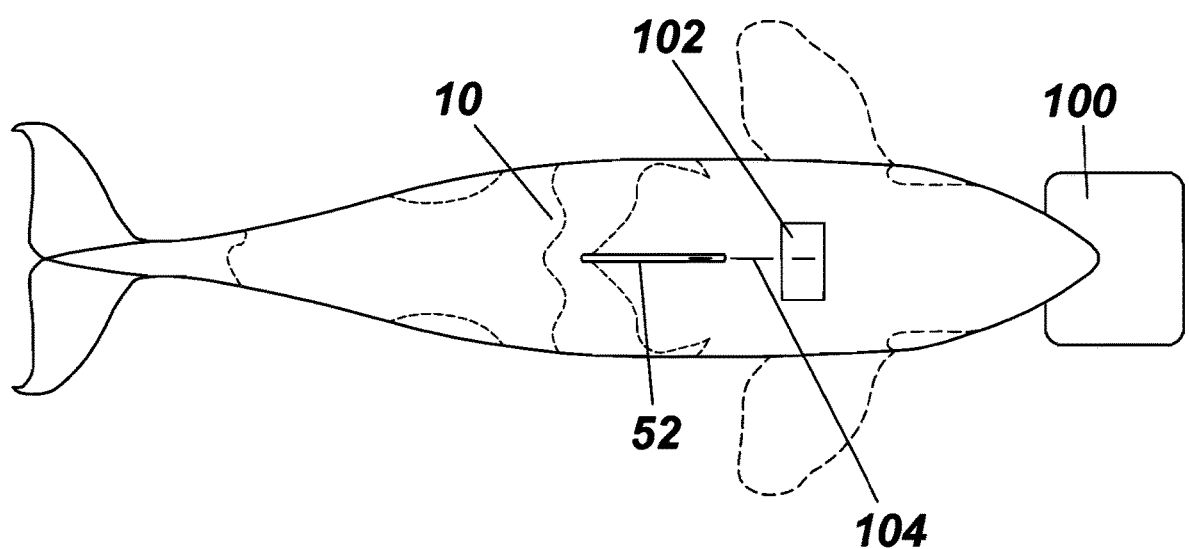
FIG. 3 is a top view thereof recharging in a docking station.

Detailed embodiments of the present invention are disclosed herein; however, it is to be understood that the disclosed embodiments are merely exemplary of the invention, which may be embodied in various forms. Therefore, specific functional and structural details disclosed herein are not to be interpreted as limiting, but merely as a basis for the claims and as a representation basis for teaching one skilled in the art to variously employ the present invention in virtually any appropriately detailed structure.

Referring to the figures set forth is a geofenced autonomous aquatic drone 10 formed from a buoyant housing 14 resembling a predator or portion thereof. For instance, the buoyant housing 14 may have the shape of an orca, sperm whale, dolphin or other shark predator with indicia 12 placed on the housing such as black and white coloring. Preferably the drone 10 includes a dorsal fin that is placed above the water surface for housing of a dgps antenna. Beneath the water surface the housing 14 may include pectoral fin. The orca whale belongs to the oceanic dolphin family and is an apex predator. Orca whales have no natural predators. Dolphins are known to use their strong snouts to ram sharks. While sharks are also apex predators, they avoid Orca and Sperm whales, and Dolphins.

A battery 16 is positioned within the buoyant housing 14; the battery 16 is constructed and arranged to be recharged through an inductive charging station 100. Inductive charging allows the buoyant housing 14 to be sealed to prevent water intrusion. The charging station 100 is preferable a floating charger that the drone will temporally couple to for a fast recharge. The drone is programmed to couple to the floating charger when the battery level drops to a predetermined level.

A microprocessor 20 is positioned within the buoyant housing 14 and is electrically coupled to the battery 16. The microprocessor interprets the dgps signal to determine an area to be patrolled. The microprocessor receives instructional information through blue tooth or short range wifi.

A transmitter unit 22 is controlled by the microprocessor 20 for operating at least one under water transducer 24. In a preferred embodiment, multiple transducers are employed. Transducers 24 and 26 are directed out the bottom 25 of the buoyant housing 14, transducer 28 is directed out the left side 27 of the buoyant housing 14 and transducer 30 is directed out the right side 29 of the buoyant housing 14. The transmitter 22 produces certain sounds through the transducers including reproduction of whale sounds or dolphin sounds. The transmitter 22 may also be used to generate sound waves, electrical frequency, or a magnetic field into water. For instance, the transmitter 22 can be a frequency generator that is adjustable in a range of frequencies between 200 Hz and 1,500 Hz, which are known to repel sharks. The transducers 24, 26, 28 and 30 are constructed and arranged to emit said sound waves in an omni-directional manner, or in a pulsing manner at a frequency undesirable to sharks.

A propulsion system 32 is operatively associated with the microprocessor 20 for controlling movement of the drone. The propulsion system 32 includes a small water jet 34 that can be rotated by a rudder controller 36 to provide directional movement; the water jet 34 moving from port to starboard in a chamber 38. Water intake 40 is directed to the water jet 34, allowing for a safe operation around swimmer (s) with no moving components accessible that could injure hands or fingers. The microprocessor 20 operates in conjunction with the DGPS receiver which provides accuracy of location to within 10 cm to 1 m. The DGPS receiver is coupled to an antenna 52 that is positioned above the water line. The shape of the antenna is preferable the shape of a whale fin but with indicia so that the device cannot be mistaken for a live whale. A portion of the buoyant housing beneath the water may look like a predator in an effort to deter sharks from the area. Orca whales are known to prey on large sharks and produce a highly vocal and pulsed call, in addition to whistles and echolocation clicks. The pulsed calls contain a low frequency content which is known to be within the shark hearing frequency range.

The microprocessor 20 controls the propulsion system 32 for directing the drone 10 to travel within a geofence area monitored by the DGPS receiver 50. The microprocessor triggers a response with then drone attempts to leave a particular mapped area. In this regard the drone may patrol an area of a beach by continuous travel along an area of water. For instance, while swimmers are present the drone may patrol the outer edge of a marked swimming area. When swimmers are not present a large portion of the swimming area may be patrolled. Transducer operation may be periodic during the patrol, or initiated at any time a shark is known to be present. Ideally the drone broadcasts the whale or dolphin calling sounds through sound waves within the water to deter sharks from entering the geofenced area. Preferably the transducers receive input from the microprocessor controlled transmitter, and are constructed and arranged to produce sound waves, an electrical frequency or a magnetic field in an omni-directional pattern beneath the water surface.

Dispersion of the chemical repellant may be initiated if sharks are known to be in the area. A solution of shark repellant can be used for dispensing. In this embodiment, a solution tank 60 having a filler cap 62 is placed in the buoyant housing 14 and is metered to allow the flow of solution to a position before or after the jet 34 through a flow tube 64. In the preferred embodiment the flow tube 64 is a capillary tube wherein solution is drawn into the flow produced by the water jet 34 thereby eliminating the need for a metering pump. The solution may consist of pheromones produced by orca whales, or any number of solutions on the market that are known to be offensive to sharks.

The invention allows a seaside town or resort area to provide a level of safety to their visitors by patrolling the waters with an autonomous drone 10 that can be operated continuously. Once programmed, the drone 10 is autonomous relying upon the GPS signals to direct the drone to either a preprogrammed track or to patrol within a geofenced area. The geofenced area is a virtual geographical boundary defined by GPS coordinates that enables the microprocessor to direct the propulsion system to stay within a boundary defined by GPS coordinates; the microprocessor will redirect the propulsion system to keep the drone within the boundaries. Should the drone attempt to leave the boundary provided by When the drone battery 16 is low, the drone will return to a docking station 100 having an inductive battery charger 102 that is powered by an available AC or DC power source 104. The docking station 100 is preferably tethered to a pier or other fixed object where power can be supplied to the docking station. The drone 10 may be programmed to patrol an area when no swimmers are present, such as at night. Alternatively, the drone 10 may follow a set track, such as the outline of the geofence, which is preferable when swimmers are present.

The terms "comprise" (and any form of comprise, such as "comprises" and "comprising"), "have" (and any form of have, such as "has" and "having"), "include" (and any form of include, such as "includes" and "including"), and "contain" (and any form of contain, such as "contains" and "containing") are open-ended linking verbs.

It is to be understood that while a certain form of the invention is illustrated, it is not to be limited to the specific form or arrangement herein described and shown. It will be apparent to those skilled in the art that various changes may be made without departing from the scope of the invention and the invention is not to be considered limited to what is shown and described in the specification and any drawings/figures included herein.

One skilled in the art will readily appreciate that the present invention is well adapted to carry out the objectives and obtain the ends and advantages mentioned, as well as those inherent therein. The embodiments, methods, shapes, procedures and techniques described herein are presently representative of the preferred embodiments, are intended to be exemplary, and are not intended as limitations on the scope. Changes therein and other uses will occur to those skilled in the art which are encompassed within the spirit of the invention and are defined by the scope of the appended claims. Although the invention has been described in connection with specific preferred embodiments, it should be understood that the invention as claimed should not be unduly limited to such specific embodiments. Indeed, various modifications of the described modes for carrying out the invention which are obvious to those skilled in the art are intended to be within the scope of the following claims.

What is claimed is:

1. An autonomous aquatic drone comprising:
   a buoyant housing resembling at least a portion of a shark predator selected from the group of consisting of an orca whale, a sperm whale or a dolphin;
   a battery positioned within said housing, said battery recharged through inductive charging;
   a microprocessor electrically coupled to said battery;
   a transmitter electrically coupled to said microprocessor and to at least one transducer constructed and arranged to produce sound waves, an electrical frequency or a magnetic field;
   a propulsion system secured to said housing and operatively associated with said microprocessor;
   a solution of orca whale pheromones dispensed through a capillary tube and admixed by said propulsion system; and
   a DGPS receiver coupled to said microprocessor;
   wherein said microprocessor is programmed to control said propulsion system for directing said buoyant housing to travel within a geofence area coordinated by said DGPS receiver.

2. The autonomous aquatic drone of claim 1 wherein said sound waves produce a sound underwater that replicates a whale call.

3. The autonomous aquatic drone of claim 1 wherein said sound waves produce a sound underwater that replicates a dolphin call.

4. The autonomous aquatic drone of claim 1, wherein said transmitter is further defined as a frequency generator for transmission through at least one transducer at an adjustable range between 200 Hz and 1,500 Hz.

5. The autonomous aquatic drone of claim 1 wherein sound waves emitted from said transducer are omni directional pulsing at a frequency undesirable to apex sharks.

6. The autonomous aquatic drone of claim 1 including a floating inductive charging station wherein said drone docks to said charging station for recharging of said drone battery.

7. The autonomous aquatic drone of claim 1 wherein said propulsion system is a water jet.

8. An autonomous aquatic drone comprising:
   a buoyant housing resembling at least a portion of a shark predator selected from the group of consisting of an orca whale, a sperm whale or a dolphin;
   a battery positioned within said housing, said battery recharged through inductive charging;
   a microprocessor positioned within said housing and electrically coupled to said battery;
   a water jet propulsion system secured to said housing and operatively associated with said microprocessor;
   a DGPS receiver coupled to said microprocessor; and
   a solution of shark repellant attached to said buoyant housing for admixing through said water jet propulsion system, said solution is drawn from a storage tank by a capillary tube, said solution consisting of orca whale pheromones;
   wherein said microprocessor is programmed to control said water jet propulsion system for directing said buoyant housing to travel within a geofence area coordinate by said DGPS receiver while said solution of shark repellant is dispensed.

9. The autonomous aquatic drone of claim 8 including a transducer to produce sound waves, electrical frequency or a magnetic field into water at a frequency undesirable to sharks.

10. The autonomous aquatic drone of claim 8 wherein said sound waves produce a sound underwater that replicates an orca whale call.

11. The autonomous aquatic drone of claim 8 wherein said sound waves produce a sound underwater that replicates a dolphin call.

12. The autonomous aquatic drone of claim 8 including a frequency generator producing a range of frequencies between 200 Hz and 1,500 Hz.

13. The autonomous aquatic drone of claim 8 including an inductive charging station floats and said drone couples to said charging station when said battery reaches a predetermined battery threshold.

* * * * *